United States Patent [19]
Mahn, Jr.

[11] Patent Number: 5,869,168
[45] Date of Patent: Feb. 9, 1999

[54] REFLECTIVE HEAT ACTIVATED TRANSFER

[76] Inventor: John Mahn, Jr., 6154 Oakhaven Dr., Cincinnati, Ohio 45202

[21] Appl. No.: 781,481

[22] Filed: Jan. 10, 1997

[51] Int. Cl.$^6$ .................................................. B32B 9/00
[52] U.S. Cl. ........................ 428/195; 428/221; 428/323; 428/343; 428/411.1; 428/457; 428/488.4; 427/206; 427/212
[58] Field of Search .................... 427/212, 206; 428/195, 411.1, 488.4, 457, 221, 343, 323

[56] References Cited

U.S. PATENT DOCUMENTS

| | | | |
|---|---|---|---|
| Re. 32,692 | 6/1988 | Nakajima | 523/222 |
| 1,111,803 | 9/1914 | Moomy . | |
| 1,567,646 | 12/1925 | Hopkinson et al. . | |
| 1,675,959 | 7/1928 | Rose . | |
| 1,756,035 | 4/1930 | Rose . | |
| 1,773,201 | 8/1930 | Rose . | |
| 2,133,914 | 10/1938 | Burke | 41/26 |
| 2,186,124 | 1/1940 | Rash | 154/40 |
| 2,334,388 | 11/1943 | Daniel | 41/34 |
| 2,622,991 | 12/1952 | Heinrich | 117/38 |
| 2,646,379 | 7/1953 | Poschel | 154/95 |
| 2,911,280 | 11/1959 | Cicogna | 8/2.5 |
| 3,241,857 | 3/1966 | Goetz . | |
| 3,279,818 | 10/1966 | Jones | 280/154.5 |
| 3,502,495 | 3/1970 | Akamatso et al. | 117/38 |
| 3,508,492 | 4/1970 | Selbert et al. | 101/470 |
| 3,787,224 | 1/1974 | Uffner | 117/72 |
| 3,911,178 | 10/1975 | McDowell et al. | 427/316 |
| 4,013,302 | 3/1977 | Oswald | 280/154.5 R |
| 4,021,591 | 5/1977 | DeVries et al. | 428/200 |
| 4,061,352 | 12/1977 | Bagne | 280/154.5 |
| 4,202,663 | 5/1980 | Haigh et al. | 8/471 |
| 4,256,159 | 3/1981 | Williams | 152/353 R |
| 4,311,181 | 1/1982 | Hausch | 152/353 |
| 4,381,640 | 5/1983 | Chakravarti et al. | 57/242 |
| 4,382,830 | 5/1983 | Cohn | 156/64 |
| 4,386,182 | 5/1983 | Zijp | 524/375 |
| 4,391,870 | 7/1983 | Ellis | 428/218 |
| 4,419,470 | 12/1983 | Davis et al. | 524/76 |
| 4,439,483 | 3/1984 | Ellis | 428/287 |
| 4,546,128 | 10/1985 | Nakajima | 523/222 |
| 4,564,204 | 1/1986 | Sullivan et al. | 280/154.5 |
| 4,576,610 | 3/1986 | Donenfeld | 8/471 |
| 4,610,904 | 9/1986 | Mahn, Sr. et al. | 428/79 |
| 4,625,983 | 12/1986 | Tye | 280/154.5 |
| 4,654,044 | 3/1987 | Gilardone, Jr. | 8/471 |
| 4,686,260 | 8/1987 | Lindemann et al. | 524/458 |
| 4,690,419 | 9/1987 | Hoshal | 280/154 |
| 4,722,541 | 2/1988 | Gray et al. | 280/154 |
| 5,010,122 | 4/1991 | Koski | 524/80 |
| 5,145,617 | 9/1992 | Hermanson et al. | 264/37 |
| 5,157,082 | 10/1992 | Johnson | 525/237 |
| 5,229,201 | 7/1993 | Blanco | 428/284 |
| 5,346,731 | 9/1994 | Nakanishi | 428/34.5 |
| 5,413,841 | 5/1995 | Mahn, Sr. et al. | 428/195 |

FOREIGN PATENT DOCUMENTS 2 224 974   5/1990   United Kingdom ............. B44F 1/06

*Primary Examiner*—William Krynski
*Assistant Examiner*—Abraham Bahta
*Attorney, Agent, or Firm*—Wood, Herron & Evans, LLP

[57] ABSTRACT

A reflective transfer includes a lower adhesive layer, an upper clear layer, and an intermediate reflective layer such as a metal foil. Indicia is imprinted on the transfer using a sublimation dye which is transferred into the upper clear layer. This provides a transfer which retains its reflective characteristic while at the same time includes printed indicia.

10 Claims, 1 Drawing Sheet

REFLECTIVE HEAT ACTIVATED TRANSFER

BACKGROUND OF THE INVENTION

Reflective material has been applied on articles of clothing and other items in a number of different ways. In particular, pressure-sensitive adhesive reflective tape has been applied to such articles.

Generally, these reflective materials are simply cut into a shape and applied to a substrate. This provides some ornamental appearance, but is relatively one-dimensional.

SUMMARY OF THE INVENTION

It is an object of the present invention to provide a reflective ornamental transfer that has printed indicia thereon. Further, it is an object of the present invention to provide such an ornamental transfer wherein the reflective qualities of the reflective material are not significantly diminished.

The present invention is premised on the realization that such an ornamental reflective transfer can be made by applying an adhesive material to one side of a reflective surface with a clear plastic on the opposite surface of the reflective material. Indicia is then imprinted into the clear plastic material employing a sublimation dye.

Preferably, the adhesive will be a thermoplastic adhesive, although pressure-sensitive adhesives could be employed. Further, the outer, clear surface is preferably a thermoset material or high melting point thermoplastic which will protect the sublimation dye after application.

The objects and advantages of the present invention will be further appreciated in light of the following detailed description and drawings in which:

DETAILED DESCRIPTION

Figure 1:
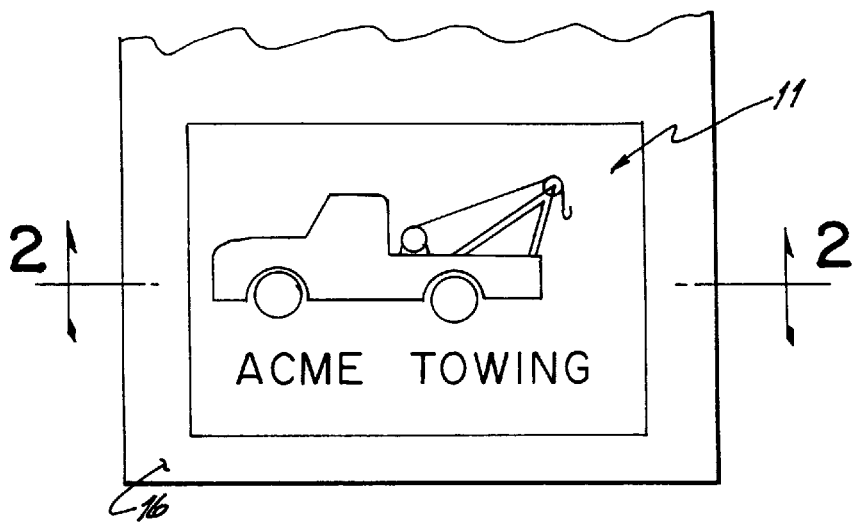
FIG. 1 is a perspective view of the present invention.
Figure 2:
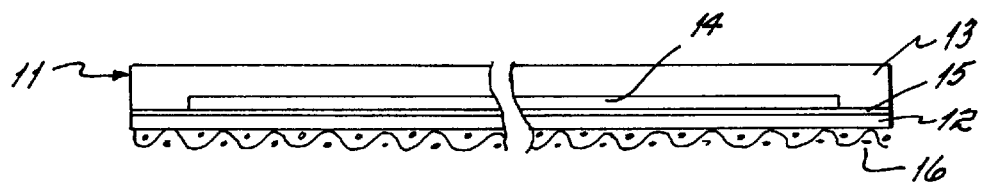
FIG. 2 is a cross-sectional view taken at lines 2—2 of FIG. 1.

The present invention is an adhesive transfer shown in FIG. 1. Transfer 11 includes a lower adhesive layer 12 and an upper clear plastic layer 13. Between layer 13 and layer 12 is a reflective layer 15. As shown in FIG. 2, indicia 14, formed from a sublimation dye, is located within the upper clear layer 13. This is shown adhered to a cloth substrate 16.

The lower layer 12 is an adhesive layer and can be a pressure-sensitive adhesive, a thermoplastic, or a thermoactive adhesive. For most applications, layer 12 will be a thermoplastic or thermoactive adhesive. The adhesive is selected so that it will adhere to the substrate to which it is applied. Under certain applications, it is desirable that the adhesive have a melting or activation temperature which is at or above the sublimation or diffusion temperature of the dye used to form indicia 14.

There are a number of different thermoplastic adhesives that are suitable for use in the present invention. Preferably, it will be a thermoplastic polymer having a high melting point—one which does not flow at temperatures less than 350° F. and preferably not less than 400° F.—although for certain markets adhesives with lower melting points such as 200° F. can be used.

A preferred adhesive is a polyurethane thermoplastic made by Morton International of Seabrook, N.H., PS455. This product has a shore A hardness of 85–90, shore D hardness of 35–40 and a melting temperature of 330° F. Also suitable is Emhart Bostik 4117 brand polyester thermoplastic adhesive having a softening point of 275° F. A suitable polyethylene adhesive is Dow® 709 or Dow® 899.

A thermosettable linear saturated polyester adhesive 10-300-3 sold by Bostik is also suitable, particularly when the transfer 11 is intended to be applied to a nylon surface.

The polyurethane adhesive sold by Morton International is good for a wide range of fabrics including polyester and polyester blends with wool and cotton, wool, cotton and triacetate. A nylon adhesive, EMS1G sold by EMS Industries, can also be used.

The upper layer 13 can be formed from a variety of different materials. These can either be thermosets or high-melting-point thermoplastics that remain solid at the sublimation temperature of the dye used to form indicia 14 as well at application temperatures. In particular, clear thermoset materials such as thermoset polyamids, thermoset polyurethanes, thermoset polyolefins, and thermoset polyepoxides and polyesters can be used. Also, clear thermoplastics such as polyethylene teraphthalate can be used, in particular Mylar. Clear is also intended to include non-opaque tinted plastic films.

The preferred thermoset layer is a clear thermoset polyurethane such as Zephyrion brand sold by Sinclair and Valentine Chemical Coating Groups of Wheelabrator-Freye, Inc. of North Kansas City, Mo. This is disclosed more fully in Mahn U.S. Pat. No. 4,610,904. The thermoset cross-link resin sold by SubliPress, Inc. and thermoset epoxy sold under the name Coat-um by Nova Chrome Inc. also function.

The upper layer 13 should have a thickness of about 0.05 mils to about 2 mils with about 0.1 to about 1.0 mils being preferred with 0.5 mils most preferred.

Between the upper clear layer 13 and lower adhesive layer 12 is the intermediate reflective layer 15. The intermediate reflective layer can be a variety of different materials. It can be ground glass particles, glass beads, metal-coated glass beads, or preferably is simply a reflective metal film such as an aluminum film. Such a film can be applied to the clear upper layer 13 in a variety of different manners. If the clear upper layer 13 is a thermoplastic material, the reflective layer can be laminated to the thermoset material with heat and pressure. A metal film can be applied to layer 13 by chemical sputtering or chemical vapor deposition. Metalized polyethylene terephthalate (Mylar®) can be purchased for this purpose. One such material is Reflexite brand of material sold by Reflexite Corporation which is a metal layer coated with a prismatic layer bonded by a primer to Mylar®. Other suppliers of metalized plastic films include 3M and Avery Dennison.

The sublimation or diffusion dye used to form indicia 14 can be one of a variety of well-known sublimation or diffusion dyes which are suitable for application to thermoset layer 13. These dyes are known and are generally used to apply indicia to woven materials.

Generally, the dispersed dyes listed in the Colour Index under the heading Dispersed Dyes are suitable. These include, for example, azo, anthraquinone, quinophthalone, nitro, azomethine, and styryl-type dyes. These are disclosed, for example, in Donenfeld U.S. Pat. No. 4,576,610, Seibert U.S. Pat. No. 3,508,492, Haigh U.S. Pat. No. 4,202,663, DeVires U.S. Pat. No. 4,021,591, Gilardone U.S. Pat. No.

4,654,044, Cicogna U.S. Pat. No. 2,911,280, and Akamatsu U.S. Pat. No. 3,502,495. One commercially available sublimation dye is sold by Xpress Company of Winston Salem, N.C. This is particularly good for offset printing applications. Others sold by Fuji KK and Eastman Kodak diffusion dye (referred to as thermal transfer diffusion donor material) are also suitable. A dye which is suitable for application with a lithographic press is sold by Roach Inc. Dyes which can be applied with a dot matrix printer are sold by Pearl Worldwide and Encore Ribbon.

To form the indicia, these dyes are reverse printed or transferred onto a transfer sheet that will withstand the diffusion temperature and release the dye at the sublimation temperature. Suitable methods for printing the dye onto the transfer sheet include thermal transfer, offset printing lithographic printing and dot matrix printing. Suitable heat transfer printers are sold by Seiko, Zebra (140) and Fargo (Prodigy Plus).

The transfer sheet 21 is typically paper coated with a release coating such as wax, high molecular weight polyethylene glycols, low molecular weight polyethylene, polytetraflouroethylene, silicone or stearic acid.

A transfer according to the present invention can be initially formed and then applied to a substrate 16 by applying heat and pressure. This will cause the adhesive layer 12 to melt, contact the substrate, and when cool bond the transfer 11 to the substrate. If adhesive layer 12 is a pressure-sensitive adhesive, this can simply be applied with pressure.

Figure 3:
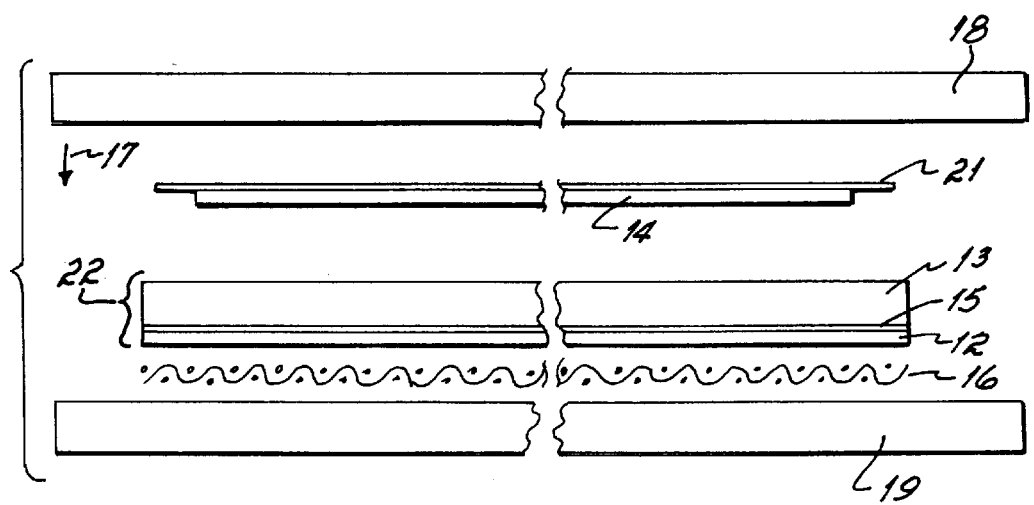
FIG. 3 is a diagrammatic depiction of a method of forming a transfer.

In the embodiment diagrammatically depicted in FIG. 3, the indicia 14 can be applied to the layer 13 at the same time the transfer 11 is applied to a substrate 16. According to this method, a laminate 22 is formed which includes the upper layer 13, the reflective layer 15, and a lower thermoplastic layer 12. This is applied against the substrate 16 with the adhesive layer 12 resting on the substrate 16. Transfer sheet 21, with indicia 14 reverse printed thereon, is placed above layer 13. Heat and pressure are applied by presses 18 and 19 in the direction shown by arrow 17. This will force the indicia 14 against layer 13 and apply heat and pressure which is effective to both cause the adhesive layer 12 to melt and bond to layer 16, and cause the sublimation dye which is indicia 14 to migrate into the surface 13, as shown in FIG. 2.

By selecting appropriate adhesive layer 12, the present invention can be used to mark a wide variety of different articles. The present invention is particularly suitable for marking cloth items such as cloth, polyester, nylon and the like. It also can be used to mark other products, and virtually any product employing the pressure sensitive adhesive. With all these application, however, the reflective nature of the reflective film is retained while at the same time the printed indicia is apparent. This provides a unique ornamental appearance which allows one to provide the safety features associated with a reflective, while at the same time allowing one to print unique indicia onto the reflective material, such as for advertising purposes.

The preceding has been a description of the present invention along with preferred methods of practicing the present invention.

However, the invention itself should only be defined by the appended claims wherein we claim:

1. A reflective transfer comprising:

an adhesive layer and a reflective film; said reflective film comprising an upper clear plastic layer and a reflective layer;

said reflective layer between said adhesive layer and said upper layer; and indicia comprising sublimation dye in said upper layer.

2. The reflective transfer claimed in claim 1 wherein said adhesive layer is a pressure-sensitive adhesive layer.

3. The reflective transfer claimed in claim 1 wherein said adhesive layer is a thermoactive adhesive layer.

4. The reflective transfer claimed in claim 3 wherein said thermoactive adhesive layer is a thermoplastic adhesive layer.

5. The reflective transfer claimed in claim 1 wherein said upper layer is a thermoplastic layer.

6. The reflective transfer claimed in claim 5 wherein said upper layer is polyethylene terephthalate.

7. The reflective transfer claimed in claim 1 wherein said upper layer is a thermoset layer.

8. The reflective transfer claimed in claim 1 wherein said reflective layer is a metal film.

9. The reflective transfer claimed in claim 1 wherein said reflective layer comprises glass beads.

10. The reflective transfer claimed in claim 9 wherein said glass beads are metal coated.

* * * * *